(12) United States Patent
Tochigi

(10) Patent No.: US 12,391,248 B2
(45) Date of Patent: Aug. 19, 2025

(54) DRIVING SUPPORT DEVICE

(71) Applicant: TOYOTA JIDOSHA KABUSHIKI KAISHA, Toyota (JP)

(72) Inventor: Kohei Tochigi, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/413,233

(22) Filed: Jan. 16, 2024

(65) Prior Publication Data
US 2024/0300491 A1    Sep. 12, 2024

(30) Foreign Application Priority Data

Mar. 9, 2023  (JP) ................................. 2023-036816

(51) Int. Cl.
*B60W 30/12*  (2020.01)

(52) U.S. Cl.
CPC ......... *B60W 30/12* (2013.01); *B60W 2520/10* (2013.01)

(58) Field of Classification Search
CPC ............ B60W 30/12; B60W 2520/10; B60W 30/143; B60W 30/18145
USPC ....................................................... 701/41
See application file for complete search history.

(56) References Cited

U.S. PATENT DOCUMENTS

| | | | |
|---|---|---|---|
| 8,204,666 B2 * | 6/2012 | Takeuchi | ............... B60K 28/06 701/70 |
| 8,355,851 B2 | 1/2013 | Inoue et al. | |
| 8,370,040 B2 | 2/2013 | Inoue et al. | |
| 8,417,430 B2 | 4/2013 | Saeki | |
| 8,548,709 B2 | 10/2013 | Morita | |
| 8,768,597 B2 | 7/2014 | Kagawa | |
| 9,174,643 B2 | 11/2015 | Aso | |
| 10,017,178 B2 | 7/2018 | Morimoto et al. | |
| 10,118,617 B2 | 11/2018 | Urano et al. | |
| 10,486,698 B2 | 11/2019 | Masui et al. | |
| 2009/0234550 A1* | 9/2009 | Takeuchi | ........ B60W 30/18009 701/70 |
| 2013/0274996 A1* | 10/2013 | Sekine | ..................... G06F 17/00 701/36 |
| 2014/0032072 A1* | 1/2014 | Yoshihama | ........... B60W 30/12 701/1 |
| 2019/0295419 A1 | 9/2019 | Tosa et al. | |

FOREIGN PATENT DOCUMENTS

| | | | | |
|---|---|---|---|---|
| DE | 102016015003 A1 * | 6/2017 | ........ B60W 30/0956 |
| JP | H10-019595 A | 1/1998 | |
| JP | 2017196967 A * | 11/2017 | |
| JP | 2017199112 A * | 11/2017 | |
| WO | WO-2020116265 A1 * | 6/2020 | |

* cited by examiner

*Primary Examiner* — Hung Q Nguyen
(74) *Attorney, Agent, or Firm* — SoraIP, Inc.

(57) ABSTRACT

The driving support device includes a vehicle speed control unit that sets a target vehicle speed of the vehicle and controls a speed of the vehicle based on the target vehicle speed, and an operation state determination unit that determines whether or not a turning assistance function that assists turning of the vehicle can be operated in a curve in front of the vehicle. When it is determined that the turning assistance function can be operated, the vehicle speed control unit increases the target vehicle speed in the curve as compared with a case where it is determined that the turning assistance function cannot be operated.

5 Claims, 4 Drawing Sheets

| SETTING OF TURNING SUPPORT FUNCTION | INCREASE IN THE TARGET SPEED |
|---|---|
| OFF | ZERO |
| SUPPORT VOLUME : SMALL | SMALL |
| SUPPORT VOLUME : MEDIUM | MEDIUM |
| SUPPORT VOLUME : LARGE | LARGE |

DRIVING SUPPORT DEVICE

CROSS-REFERENCE TO RELATED APPLICATION

This application claims priority to Japanese Patent Application No. 2023-036816 filed on Mar. 9, 2023, incorporated herein by reference in its entirety.

BACKGROUND

1. Technical Field

The present disclosure relates to a driving support device.

2. Description of Related Art

Japanese Unexamined Patent Application Publication No. 10-019595 (JP 10-019595 A) describes that a limit vehicle speed is calculated based on a curvature of a curve in front of a vehicle, and deceleration control is performed when the speed of the vehicle becomes equal to or higher than the limit vehicle speed.

SUMMARY

However, when the limit vehicle speed is set uniformly based only on the curvature of the curve, there is a possibility that the vehicle is excessively decelerated when the vehicle turns. For example, when a turning support function that supports turning of the vehicle is operated, stable turning at a high vehicle speed is possible regardless of the driving skill of a driver.

In view of the above issues, an object of the present disclosure is to suppress a vehicle from being excessively decelerated when the vehicle turns, when a speed of the vehicle is automatically controlled.

The gist of the present disclosure is as follows.

(1) A driving support device includes:
a vehicle speed control unit that sets a target vehicle speed of a vehicle and controls a speed of the vehicle based on the target vehicle speed; and
an operation state determination unit that determines whether a turning support function for supporting turning of the vehicle is able to be operated in a curve in front of the vehicle. When determination is made that the turning support function is able to be operated, the vehicle speed control unit sets the target vehicle speed higher, as compared with a case in which determination is made that the turning support function is not able to be operated.

(2) In the driving support device according to (1),
an amount of support in the turning support function is able to be selected by a driver of the vehicle, and
the vehicle speed control unit increases an amount of increase in the target vehicle speed in the curve as the amount of support increases.

(3) In the driving support device according to (1) or (2), when an operation condition of the turning support function is not satisfied, the operation state determination unit determines that the turning support function is not able to be operated in the curve.

(4) In the driving support device according to (3), the operation condition includes that reliability of lane recognition in the curve is equal to or greater than a predetermined value.

(5) In the driving support device according to (4), the vehicle speed control unit increases an amount of increase in the target vehicle speed in the curve as the reliability increases.

(6) In the driving support device according to any one of (3) to (5), the vehicle speed control unit determines a provisional value of the target vehicle speed in the curve based on a curvature of the curve, and
the operation condition includes that the provisional value is equal to or greater than a predetermined value.

According to the present disclosure, it is possible to suppress the vehicle from being excessively decelerated when the vehicle turns, when a speed of the vehicle is automatically controlled.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
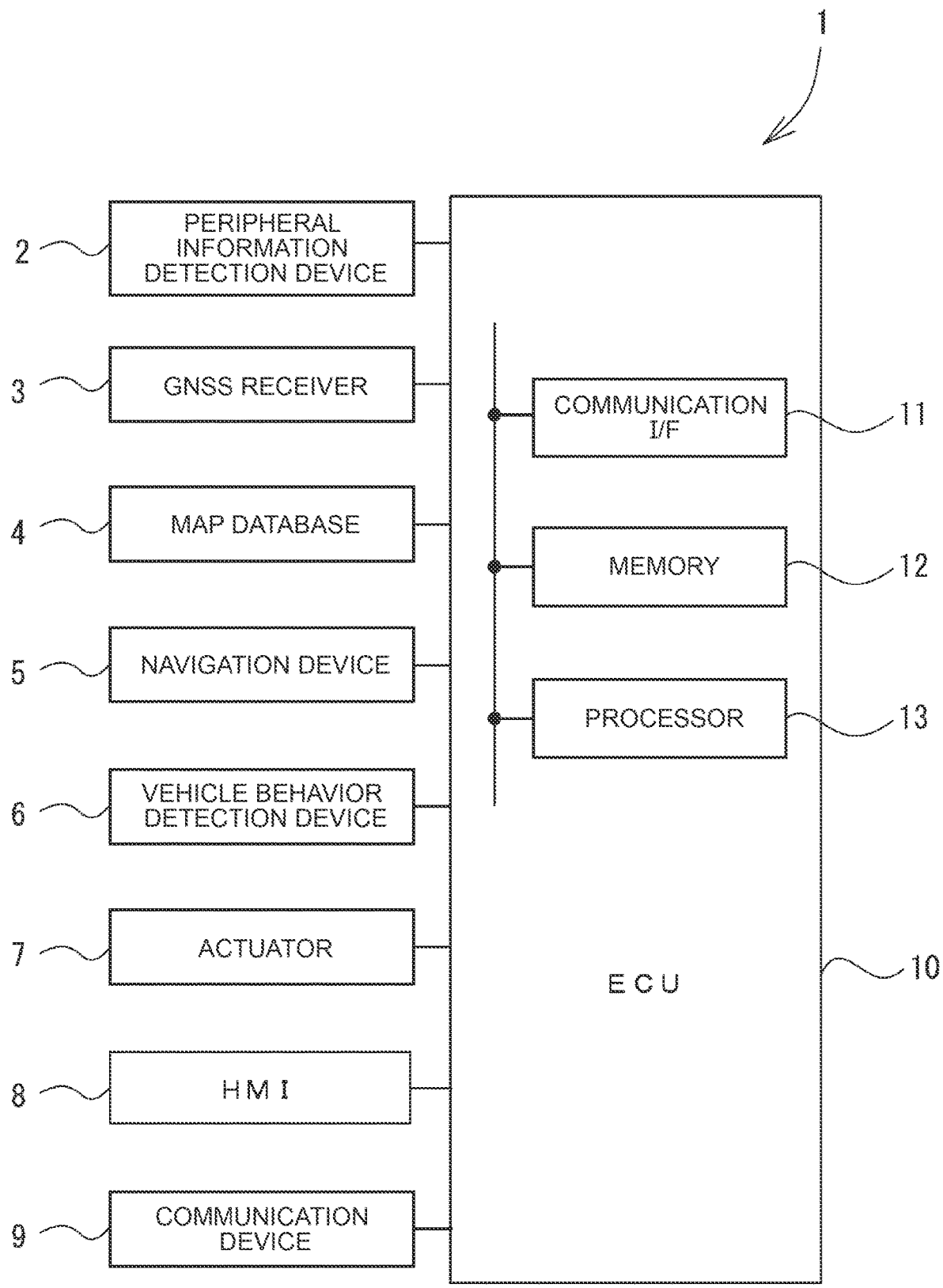
FIG. 1 is a diagram schematically illustrating a part of a configuration of a vehicle provided with a driving support device according to an embodiment of the present disclosure.

Hereinafter, embodiments of the present disclosure will be described in detail with reference to the drawings. In the following description, the same reference numerals are given to the same constituent elements.

FIG. 1 is a diagram schematically illustrating a part of a configuration of a vehicle 1 provided with a driving support device according to an embodiment of the present disclosure.

As shown in FIG. 1, a vehicle 1 (host vehicle) includes a peripheral information detection device 2, a Global Navigation Satellite System (GNSS receiver 3, a map database 4, a navigation device 5, a vehicle behavior detection device 6, an actuator 7, a Human Machine Interface (HMI) 8, a communication device 9, and an Electronic Control Unit (ECU) 10. The peripheral information detection device 2, GNSS receiver 3, the map database 4, the navigation device 5, the vehicle behavior detection device 6, the actuator 7, HMI 8, and the communication device 9 are electrically connected to ECU 10 via an in-vehicle network or the like compliant with standards such as Controller Area Network (CAN).

The peripheral information detection device 2 acquires data (images, point cloud data, and the like) around the vehicle 1 (the host vehicle), and detects peripheral information of the vehicle 1 (for example, a peripheral vehicle, a white line, a guardrail, a curbstone, a sign, and the like). For example, the peripheral-information detection device 2 may include a millimeter-wave radar, a camera (monocular camera or stereo camera), a Laser Imaging Detection And Ranging (LIDAR, an ultrasonic sensor (sonar), or any combination thereof. The peripheral information detection device 2 outputs, that is, the peripheral information of the vehicles 1 detected by the peripheral information detection device 2 is transmitted to ECU 10.

GNSS receiver 3 detects the present position of the vehicle 1 (for example, the latitude and longitude of the vehicle 1) based on positioning information obtained from a plurality of (for example, three or more) positioning satellites. Specifically, GNSS receiver 3 captures a plurality of positioning satellites and receives radio waves transmitted from the positioning satellites. Then, GNSS receiver 3 calculates the distance to the positioning satellite based on the difference between the transmission time and the reception time of the radio wave, and detects the present position of the vehicle 1 based on the distance to the positioning satellite and the position (orbit information) of the positioning satellite. The power of GNSS receiver 3, i.e., the present position of the vehicles 1 detected by GNSS receiver 3, is transmitted to ECU 10. GNSS receivers include Global Positioning System (GPS) receivers.

The map database 4 stores map information. The map information includes road position information, road shape information (for example, a type of a curve and a straight portion, a curvature of a curve, a road gradient, and the like), road information such as a road type and a restricted vehicle speed. ECU 10 obtains map data from the map database 4. Note that a map database may be provided outside the vehicle 1 (e.g., servers, etc.), and ECU 10 may acquire map information from outside the vehicle 1.

The navigation device 5 sets the travel route of the vehicle 1 to the destination based on the present position of the vehicle 1 detected by GNSS receiver 3, the map information of the map database 4, the input by the occupant (for example, a driver) of the vehicle 1, and the like. The travel route set by the navigation device 5 is transmitted to ECU 10.

The vehicle behavior detection device 6 detects a parameter indicating the behavior of the vehicle 1. The vehicle behavior detection device 6 includes, for example, a vehicle speed sensor that detects the speed of the vehicle 1, a yaw rate sensor that detects the yaw rate of the vehicle 1, and the like. The output of the vehicle behavior detection device 6, i.e., the parameter detected by the vehicle behavior detection device 6, is transmitted to ECU 10.

The actuator 7 operates the vehicle 1. For example, the actuator 7 includes a driving device (for example, at least one of an internal combustion engine and an electric motor) for acceleration of the vehicle 1, a brake actuator for braking (decelerating) of the vehicle 1, a steering actuator for steering of the vehicle 1, and the like. ECU 10 controls the actuator 7 to control the behavior of the vehicles 1.

HMI 8 is provided in the vehicle cabin and exchanges data between the vehicle 1 and an occupant (for example, a driver) of the vehicle 1. HMI 8 includes an output unit (for example, a display, a speaker, a light source, a vibrating unit, and the like) that provides information to an occupant of the vehicle 1, and an input unit (for example, a touch panel, an operation button, an operation switch, a microphone, and the like) to which information is input by the occupant of the vehicle 1. The output of ECU 10 is notified to the occupant of the vehicle 1 via HMI 8, and the input from the occupant of the vehicle 1 is transmitted to ECU 10 via HMI 8. HMI 8 may be an input device, an output device, or an input/output device. Note that a mobile terminal (smart phone, tablet terminal, or the like) of the occupant of the vehicle 1 may be connected to ECU 10 so as to be able to communicate with each other by wire or wirelessly, and may function as an HMI 8. HMI 8 may be integrated with the navigation device 5.

The communication device 9 is capable of communicating with the outside of the vehicle 1, and is capable of communicating between the vehicle 1 and the outside of the vehicle 1. For example, the communication device 9 includes a wide area communication device that enables wide area communication between the vehicle 1 and the outside of the vehicle 1 (for example, a server) via a communication network such as a carrier network or an Internet network, an inter-vehicle communication device that enables inter-vehicle communication between the vehicle 1 and the surrounding vehicle using a predetermined frequency band, and a road-to-vehicle communication device that enables road-to-vehicle communication between the vehicle 1 and the roadside device using a predetermined frequency band.

ECU 10 executes various controls of the vehicles 1. As shown in FIG. 1, ECU 10 includes a communication interface 11, a memory 12, and a processor 13. The communication interface 11 and the memory 12 are connected to the processor 13 via a signal line. In the present embodiment, one ECU 10 is provided, but a plurality of ECU may be provided for each function.

The communication interface 11 has interface circuitry for connecting ECU 10 to the in-vehicle networking. ECU 10 is connected to other in-vehicle devices via the communication interface 11.

The memory 12 includes, for example, a volatile semiconductor memory and a non-volatile semiconductor memory. The memory 12 stores programs, data, and the like used when various kinds of processing are executed by the processor 13.

The processor 13 comprises one or more Central Processing Unit (CPU) and its peripheral circuitry. The processor 13 may further include an arithmetic circuit such as a logical arithmetic unit or a numerical arithmetic unit.

Figure 2:
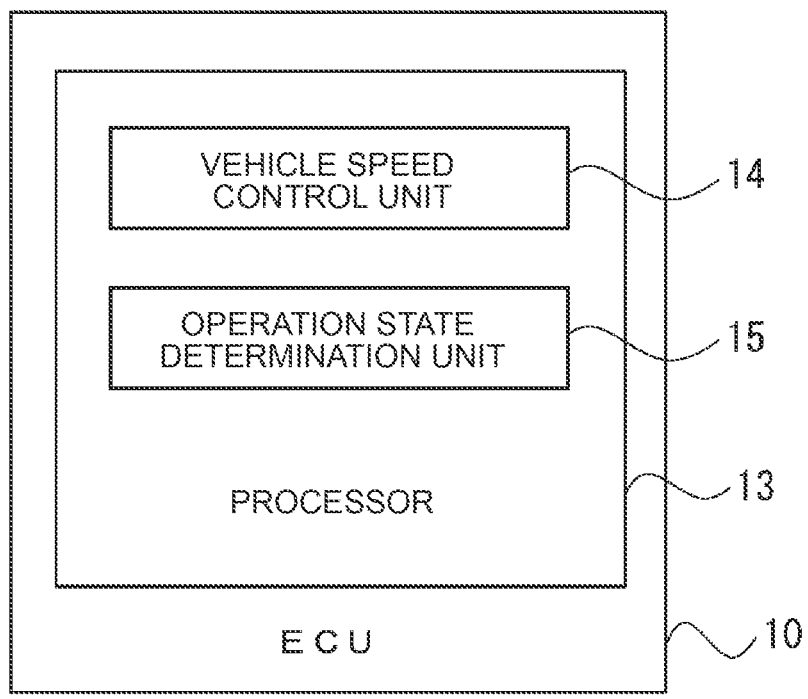
FIG. 2 is a functional diagram of a processor of an ECU.

FIG. 2 is a functional diagram of the processor 13 of ECU 10. In the present embodiment, ECU 10 functions as a driving support device that supports driving of the drivers of the vehicles 1. As illustrated in FIG. 2, the processor 13 of ECU 10 includes a vehicle speed control unit 14 and an operation state determination unit 15. The vehicle speed control unit 14 and the operation state determination unit 15 are functional modules realized by ECU 10 processor 13 executing a computer program stored in ECU 10 memory 12. These functional modules may be realized by dedicated arithmetic circuits provided in the processor 13.

The vehicle speed control unit 14 controls the speed of the vehicle 1. Specifically, the vehicle speed control unit 14 controls the speed of the vehicle 1 by controlling the acceleration and deceleration of the vehicle 1 using the actuator 7. That is, in the vehicle 1, the speed of the vehicle 1 is automatically controlled without requiring an operation by the driver of the vehicle 1.

Normally, the speed limit is determined on the road on which the vehicle 1 travels. Further, in order to smoothly turn the vehicle 1, it is necessary to lower the speed of the vehicle 1 in the curve as compared with the straight road. Therefore, the vehicle speed control unit 14 sets the target vehicle speed of the vehicle 1 based on the road information and the like, and controls the speed of the vehicle 1 based on the target vehicle speed. For example, the vehicle speed control unit 14 controls the acceleration and deceleration of the vehicle 1 by using the actuator 7 so that the speed of the vehicle 1 becomes the target vehicle speed. The vehicle speed control unit 14 may set the target vehicle speed of the vehicle 1 as the upper limit speed of the vehicle 1, and control the acceleration and deceleration of the vehicle 1 using the actuator 7 so that the speed of the vehicle 1 does not exceed the target vehicle speed.

In the present embodiment, ECU 10 controls the actuator 7 to perform a predetermined driving support function. The predetermined driving assistance function includes a turning assistance function for assisting the turning of the vehicle 1. In the present embodiment, ECU 10 performs, as the turning assistance function, a Lane Tracing Assist (LTA of automatically controlling the steering of the vehicle 1 so that the vehicle 1 is maintained in the lane. It is also referred to as Lane Keeping Assist (LKA).

The operation state determination unit 15 determines whether or not the turning support function can be operated in a curve in front of the vehicle 1. When the turning assistance function is activated, stable turning at a high vehicle speed is possible regardless of the driving skill of the driver of the vehicle 1. Therefore, in the present embodiment, the vehicle speed control unit 14 changes the target vehicle speed of the vehicle 1 in the curve in accordance with the operating state of the turning assistance function. Specifically, when it is determined that the turning assistance function can be operated, the vehicle speed control unit 14 increases the target vehicle speed of the vehicle 1 in the curve as compared with the case where it is determined that the turning assistance function cannot be operated. Accordingly, when the speed of the vehicle 1 is automatically controlled, it is possible to suppress the vehicle 1 from being excessively decelerated when the vehicle 1 turns.

Figure 3:
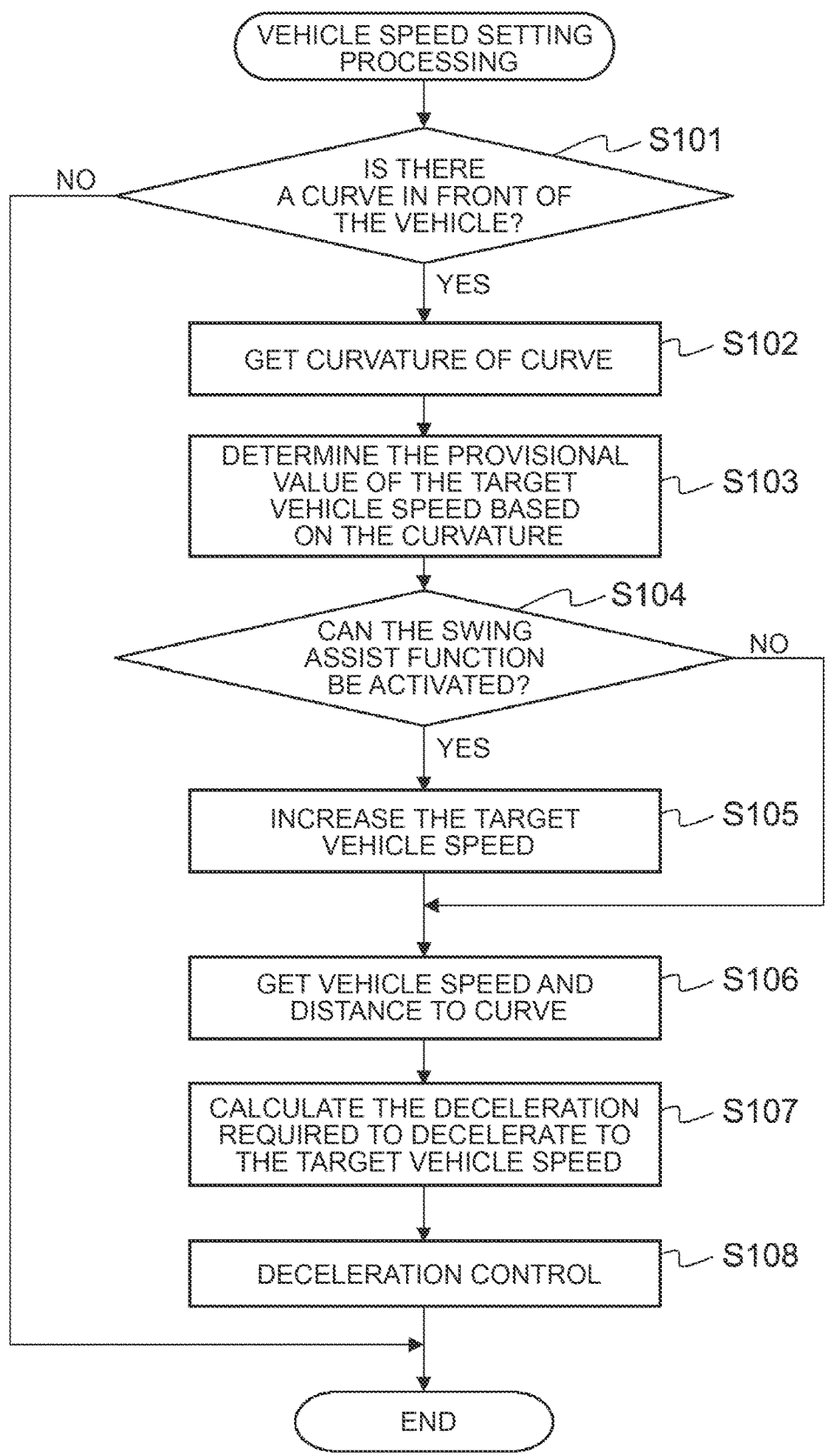
FIG. 3 is a flowchart illustrating a control routine of the vehicle speed setting process.

Hereinafter, a processing flow of the above-described control will be described with reference to FIG. 3. FIG. 3 is a flowchart illustrating a control routine of the vehicle speed setting process. This control routine is repeatedly executed by ECU 10 processor 13 (the vehicle speed control unit 14 and the operation state determination unit 15) while the ignition switch of the vehicle 1 is turned on.

First, in S101, the vehicle speed control unit 14 determines whether or not a curve exists in front of the vehicle 1. For example, the vehicle speed control unit 14 determines whether or not a curve exists in front of the vehicle 1 by collating the travel route of the vehicle 1 set by the navigation device 5 with the map information stored in the map database 4. The vehicle speed control unit 14 may determine whether or not a curve exists in front of the vehicle 1 by detecting a curve in front of the vehicle 1 based on the output of the peripheral information detection device 2. Further, the vehicle speed control unit 14 may determine whether or not a curve exists in front of the vehicle 1 by calculating the travel trajectory of the preceding vehicle based on the output of the peripheral information detection device 2. Further, the vehicle speed control unit 14 may determine whether or not a curve exists in front of the vehicle 1 by acquiring information via the inter-vehicle communication or the road-to-vehicle communication.

If it is determined in S101 that there is no curve in front of the vehicle 1, the present control routine ends. On the other hand, if it is determined in S101 that a curve exists in front of the vehicle 1, the present control routine proceeds to S102.

In S102, the vehicle speed control unit 14 acquires the curvature of the curve in front of the vehicle 1. For example, the vehicle speed control unit 14 acquires the curvature of the curve from the map information stored in the map database 4. The vehicle speed control unit 14 may acquire the curvature of the curve based on the shape of the white line detected by the peripheral information detection device 2, the traveling locus of the preceding vehicle calculated based on the output of the peripheral information detection device 2, or the information acquired via the inter-vehicle communication or the road-to-vehicle communication.

Next, in S103, the vehicle speed control unit 14 determines the provisional value of the target vehicle speed of the vehicle 1 in the curve based on the curvature of the curve. For example, the vehicle speed control unit 14 determines a provisional value of the target vehicle speed by using a map indicating a relationship between the curvature of the curve and the target vehicle speed. The vehicle speed control unit 14 lowers the provisional value of the target vehicle speed as the curvature of the curve increases, that is, as the curvature radius of the curve decreases.

Next, in S104, the operation state determination unit 15 determines whether or not the turning assistance function can be operated in a curve in front of the vehicle 1. In the present embodiment, the drivers of the vehicles 1 set the operating status of the turning support function via HMI 8. In this case, the operation state determination unit 15 determines whether or not the turning support function can be operated based on the setting status of the turning support function. Specifically, the operation state determination unit 15 determines that the turning support function cannot be operated when the turning support function is set to off, and determines that the turning support function can be operated when the turning support function is set to on.

However, even if the turning assistance function is set to ON, the operating condition of the turning assistance function may not be satisfied. Therefore, even if the turning support function is set to ON, the operation state determination unit 15 may determine that the turning support function cannot be operated when the operation condition of the turning support function is not satisfied. As a result, it is possible to more accurately predict whether or not the turning support function is activated.

When the turning assistance function is activated based on the lane recognition, it is necessary to accurately recognize the lane in the curve in order to operate the turning assistance function with high reliability. Further, when the speed of the vehicle 1 in the curve is low, the torque required for turning of the vehicle 1 increases, and there is a possibility that the turning of the vehicle 1 cannot be smoothly supported by using the actuator 7. For this reason, for example, the operating condition of the turning support function includes that the reliability of lane recognition in the curve is equal to or greater than a predetermined value, and that the provisional value of the target vehicle speed is equal to or greater than the predetermined value. In this case, when the reliability of lane recognition in the curve is less than the predetermined value, or when the provisional value of the target vehicle speed is less than the predetermined value, the operation state determination unit 15 determines that the turning support function cannot be operated in the curve. Note that the operating condition of the turning support function may be one of these conditions. In addition, the operating condition of the turning support function may include other conditions than those described above.

If it is determined that the turning assistance function can be activated in S104, the control routine proceeds to S105. In S105, the vehicle speed control unit 14 increases the target vehicle speed of the vehicle 1 in the curve in front of the vehicle 1. For example, the vehicle speed control unit 14 increases the target vehicle speed of the vehicle 1 by adding a predetermined increase amount to the provisional value of the target vehicle speed. The increment of the target vehicle speed is set to, for example, a fixed value (for example, +3 km/h to +10 km/h).

Further, the larger the support amount of the turning support function is, the more stable turning of the vehicle 1 becomes possible. For example, the larger the assistance amount of the turning assistance function, the larger the magnitude or the change amount of the steering torque generated by the actuator 7 when the turning assistance function is activated. Therefore, when the support amount of the turning support function is selectable by the driver of the vehicle 1, the vehicle speed control unit 14 may increase the increase amount of the target vehicle speed as the support amount selected by the driver increases. As a result, it is possible to set the increase amount of the target vehicle speed to a more appropriate value corresponding to the support amount of the turning support function.

Figures 4, 5:
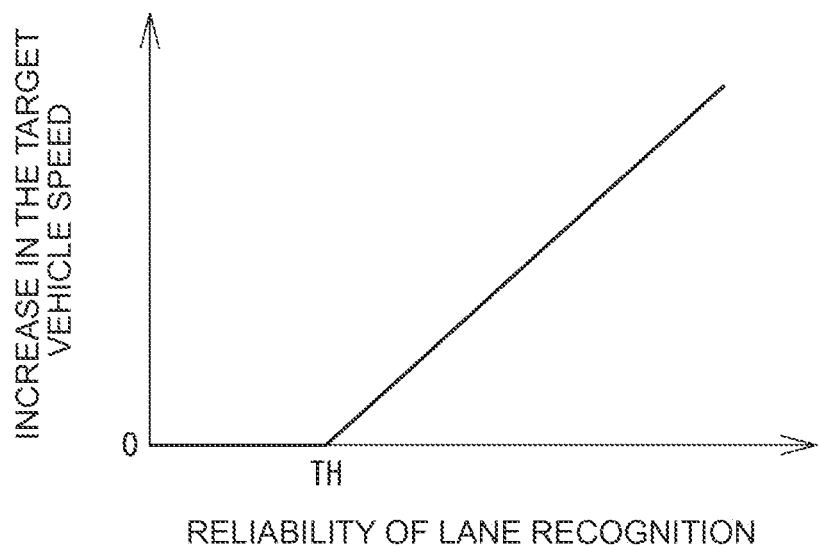
FIG. 4 is a diagram illustrating an exemplary map showing a relation between the setting of the turning support function and the increasing amount of the target velocity.
FIG. 5 is a diagram illustrating a relationship between a reliability of lane recognition and an increase amount of a target vehicle speed.

FIG. 4 is a diagram illustrating an example of a map showing a relationship between the setting of the turning support function and the increase amount of the target speed. In the example of FIG. 4, the support amount of the turning support function is set to three stages (small, medium, and large), and the increase amount of the target speed increases stepwise according to the support amount.

Further, the vehicle speed control unit 14 may increase the increase amount of the target vehicle speed in the curve as the reliability of the lane recognition in the curve in front of the vehicle 1 increases. This makes it possible to set the increase amount of the target vehicle speed to a more appropriate value corresponding to the operation stability of the turning assistance function. For example, a lane is identified using a machine learning model based on a technique such as semantic segmentation, and the reliability of lane recognition is output by the machine learning model. The reliability of the lane recognition may be calculated based on the update date of the map information stored in the map database 4, the accuracy of GNSS receiver 3, and the like. For example, the reliability of the lane recognition is lowered as the updated date of the map information is older, and is lowered as Dilution of Precision (DOP of GNSS receiver 3 is higher.

FIG. 5 is a diagram illustrating a relationship between a reliability of lane recognition and an increase amount of a target vehicle speed. As illustrated in FIG. 5, when the reliability of the lane recognition is less than the predetermined TH, the turning assistance function cannot be operated, and therefore, the target vehicle speed is set to be increased to zero. On the other hand, when the reliability of the lane recognition is equal to or higher than the predetermined TH, the increment of the target vehicle speed increases linearly as the reliability increases.

After S105, the control proceeds to S106. On the other hand, when it is determined in S104 that the turning support function cannot be operated, the present control routine skips S105 and proceeds to S106. In this case, the vehicle speed control unit 14 sets the provisional value of the target vehicle speed to the final target vehicle speed without correcting the target vehicle speed.

In S106, the vehicle speed control unit 14 acquires the speed of the vehicle 1 based on the output of the vehicle speed sensor of the vehicle behavior detection device 6, and acquires the distance from the present position of the vehicle 1 to the curve based on the output of the peripheral information detection device 2, the output of GNSS receiver 3, and the like.

Next, in S107, the vehicle speed control unit 14 calculates the deceleration required for the vehicle 1 to decelerate to the target vehicle speed at the entrance of the curve. For example, the deceleration a (m/s²) is calculated based on the current speed Vc (m/s) of the vehicle 1, the target vehicle speed Vt (m/s) of the vehicle 1, and the distance L from the current position of the vehicle 1 to the curve by the following equation (1).

$$a = (Vc^2 - Vt^2)/2L \qquad (1)$$

For example, if the current speed Ve of the vehicle is 33.33 m/s (120 km/h), the target vehicle speed Vt of the vehicle 1 is 29.16 m/s (85 km/h), and the distance L to the curve is 150 m, then the deceleration a is 0.87 m/s² (0.089 G).

Next, in S108, the vehicle speed control unit 14 decelerates the vehicle 1 at the deceleration calculated in S107 using the actuator 7. After S108, the control routine ends. The target vehicle speed may be determined based on the curvature of the curve and the determination of S104 without determining the provisional target vehicle speed.

While preferred embodiments of the present disclosure have been described above, the present disclosure is not limited to these embodiments, and various modifications and changes can be made within the scope of the claims.

For example, the turning assistance function implemented in the vehicle 1 may be Proactive Driving Assist (PDA) constant steering assistance in the lane, Dynamic Rear Steering (DRS), G Vectoring Control (GVC), or the like. In the constant steering assistance in the lane, ECU 10 predicts the driver's manipulation and changes the reaction force of the steering of the vehicle 1 in order to facilitate the steering by the driver. In DRS, ECU 10 controls the direction of the rear wheels of the vehicle 1 based on the steering manipulation by the driver and the speed of the vehicle 1, and enhances the handling property during the low-speed running, the steering responsiveness during the medium-speed running, and the vehicle stability during the high-speed running. In GVC, in order to enhance steering responsiveness and vehicle stability, ECU 10 controls the driving torque of the driving device (for example, an internal combustion engine) during the turning of the vehicle 1 to move the load from the front wheel to the rear wheel.

In addition, a computer program that causes a computer to realize the functions of the respective units included in the processor 13 of ECU 10 may be provided in a form stored in a computer-readable recording medium. The computer-readable recording medium is, for example, a magnetic recording medium, an optical recording medium, or a semiconductor memory.

In addition, a server capable of communicating with the vehicle 1 via wide-area communication such as a communication network may function as a driving support device. In this case, vehicle information such as the position and velocity of the vehicle 1 is periodically transmitted from the vehicle 1 to the server, and the server controls the vehicle 1 via ECU 10 of the vehicle 1.

What is claimed is:

1. A driving support device comprising:
    a vehicle speed control unit that sets a target vehicle speed of a vehicle and controls a speed of the vehicle based on the target vehicle speed; and
    an operation state determination unit that determines whether a turning support function for supporting turning of the vehicle is able to be operated in a curve in front of the vehicle, wherein, when determination is made that the turning support function is able to be operated, the vehicle speed control unit sets the target vehicle speed higher, as compared with a case in which determination is made that the turning support function is not able to be operated, wherein an amount of support in the turning support function is able to be selected by a driver of the vehicle, and wherein the vehicle speed control unit increases an amount of increase in the target vehicle speed in the curve as the amount of support increases.

2. The driving support device according to claim 1, wherein, when an operation condition of the turning support function is not satisfied, the operation state determination unit determines that the turning support function is not able to be operated in the curve.

3. The driving support device according to claim 2, wherein the operation condition includes that reliability of lane recognition in the curve is equal to or greater than a predetermined value.

4. The driving support device according to claim 3, wherein the vehicle speed control unit increases an amount of increase in the target vehicle speed in the curve as the reliability increases.

5. The driving support device according to claim 2, wherein:
   the vehicle speed control unit determines a provisional value of the target vehicle speed in the curve based on a curvature of the curve; and
   the operation condition includes that the provisional value is equal to or greater than a predetermined value.

\* \* \* \* \*